Jan. 12, 1960

H. E. BEESON 2,920,881

LOCKOUT MECHANISM FOR SCALE

Filed Feb. 18, 1955

INVENTOR.
Harry E. Beeson
BY
Harness, Dickey & Pierce.
ATTORNEYS.

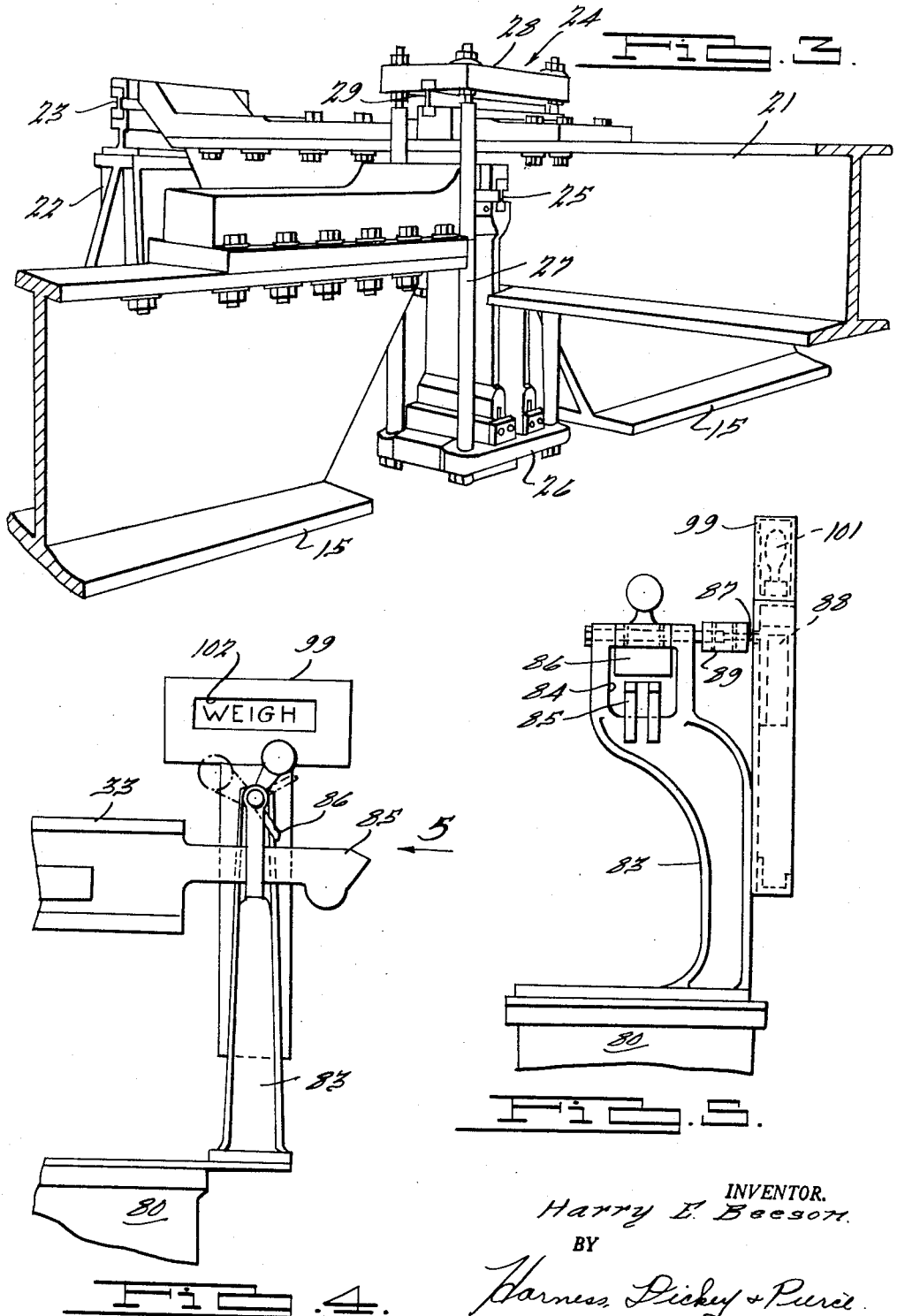

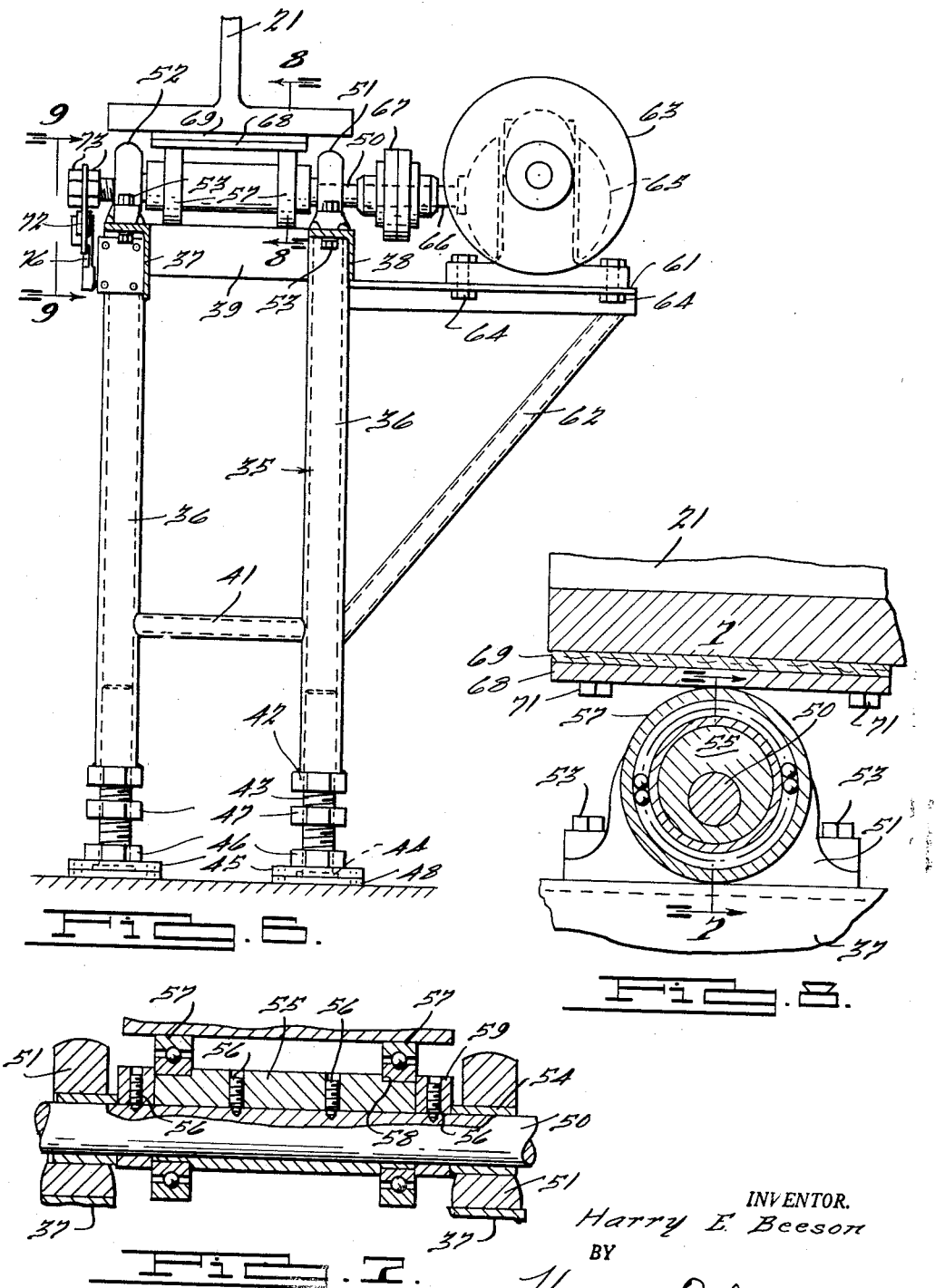

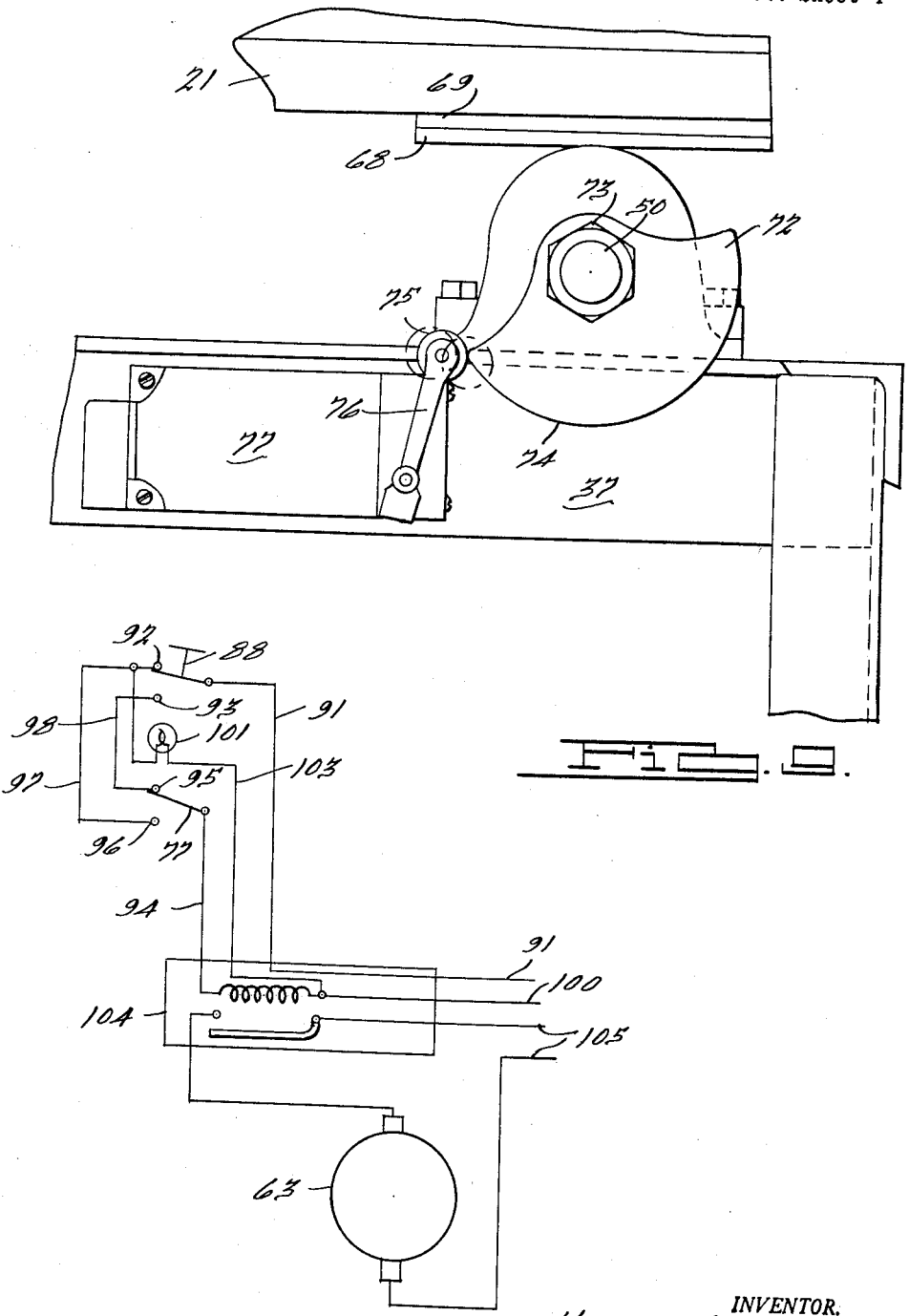

United States Patent Office 2,920,881
Patented Jan. 12, 1960

2,920,881

LOCKOUT MECHANISM FOR SCALE

Harry E. Beeson, Inkster, Mich., assignor to Detroit, Toledo and Ironton Railroad Company, Dearborn, Mich., a corporation of Delaware Application February 18, 1955, Serial No. 489,161

7 Claims. (Cl. 265—71)

This invention relates to lockout devices for scales, and particularly to a lockout device which engages a beam actuating arm and prevents its movement.

When employing scales for weighing heavy objects, such as those for weighing railroad cars, heavy trucks, and the like, substantial vibration occurs to the weighing beams when the car, truck or other heavy device to be weighed is moved on and off the scale platform. While the beam which gives the weight readings has always been provided with a lockout arm, nevertheless the entire weighing mechanism is subject to the vibrations occurring when the load is moved onto and from the platform.

The present invention pertains to a stabilizing device which engages the transverse extension lever of the weighing beams which actuates the reading beam to raise the lever slightly and take the load which otherwise would cause its deflection when the car, truck or the like is moved upon the scale platform. With such an arrangement, vibration and the resulting wear are eliminated from the weighing mechanism which will provide accurate indication of weight at all times.

Accordingly, the main objects of the invention are: to provide an engaging and lifting device for the transverse extension lever of scale beams for taking the weight off the supporting beams when the scale is not being used; to provide a motor for driving an eccentric shaft which raises the transverse extension lever of the scale beams to remove the vibration and shock from the beams actuated by a switch from the locking arm of a reading beam which raises the transverse extension lever after a weighing operation has been performed; to provide a cam on the lockout mechanism for the scale beams which actuates a switch to stop the operation of the motor at the end of the lifting operation, which motor is again energized when the reading beam is unlocked to lower the lockout mechanism out of contact with the extension lever, whereupon the cam actuates the switch to terminate the operation of the motor, and in general, to provide a mechanism for raising the scale extension lever to remove vibration from the weighing beams, which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Fig. 3 is a broken view at the center of the weighing beams, with the extension lever clearly illustrated;

Fig. 4 is an enlarged view in elevation of the reading beam end with the locking arm associated therewith as illustrated in the circle of Fig. 1;

Fig. 5 is a side view of the structure illustrated in Fig. 4, as viewed from the arrow 5 thereof;

Fig. 6 is an enlarged view in elevation of the scale beam stabilizer illustrated in Fig. 1, as viewed from the point 6;

Fig. 7 is an enlarged sectional view of structure illustrated in Fig. 8, taken on the line 7—7 thereof;

Fig. 8 is an enlarged sectional view of the structure illustrated in Fig. 6, taken on the line 8—8 thereof;

Fig. 9 is an enlarged broken view of the structure illustrated in Fig. 6, as viewed from line 9—9 thereof, and Fig. 10 is a wiring diagram employed with the structure illustrated in the foregoing figures.

Figure 1:
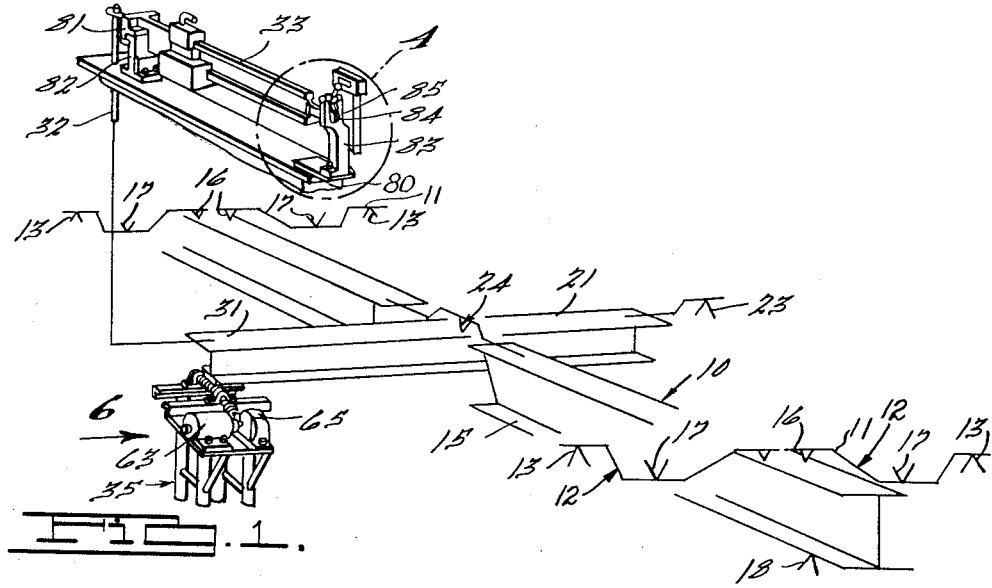
Figure 1 is a diagrammatic view of a beam scale and a lockout mechanism associated therewith embodying features of the present invention.
Figure 2:
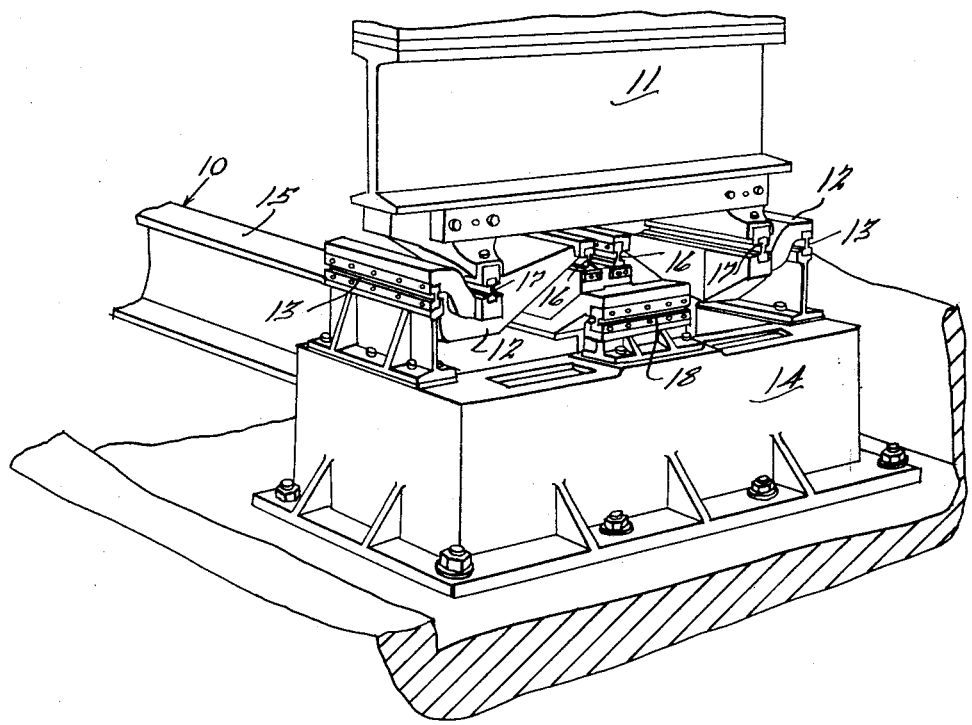
Fig. 2 is a perspective view of one end of the beam scale illustrated diagrammatically in Fig. 1.

In Fig. 1, a beam scale 10 is illustrated as comprising end beams 11 which support the scale platform on which heavy devices, such as a railroad car, truck, and the like, are supported when being weighed. The beams 11 are supported upon arms 12 which are fulcrumed at 13 at one end to a base 14 and at the other end to the longitudinally extending beams 15 by the fulcrums 16. Intermediate the ends of the arms 12, the beams 11 apply their load through the fulcrums 17. The longitudinally extending beams 15 are attached to the base 14 by the fulcrums 18. In this manner, the load applied to the platform supporting beams 11 is transferred to the longitudinally extending beams 15 at each end in a manner to cause the adjacent ends thereof at the center of the platform to move downwardly.

Between the ends of the longitudinally extending beams 15, a transversely extending lever beam 21 is mounted having its rear end supported on a standard 22 by a fulcrum 23. The ends of the longitudinally extending beams 15 are attached to the transversely extending lever beam 21 by a fulcrum mechanism 24 which engages the beam 21 interjacent its ends. As illustrated in Fig. 3, the ends of the beams 15 are attached by fulcrums 25 to a plate 26 which is urged downwardly thereby. This downward force is applied through rods 27 to a top plate 28 which is connected by a fulcrum 29 to the transversely extending lever beam 21 to cause the forward end 31 of the beam 21 to deflect downwardly under load. The end 31 of the transversely extending lever beam 21 is connected by suitable rods 32 to a reading beam 33 of the weighing device.

The scale as described is of conventional form and is herein shown by way of illustration and forms no part of the present invention. It is to be understood that other types of scales, whether using fulcrums, pressure pads or the like and whether of different construction from the one herein illustrated, may be utilized with the present invention. In other words, the present invention applies to the stabilizer for engaging the lever beam which actuates the reading beam and prevents the deflection of the lever beam to prevent vibration and damage to the weighing mechanism.

The stabilizer of the present invention embodies an adjustable table 35 having four tubular legs 36 thereon which are connected together at the top by angle members 37, 38 and 39 across the four sides thereof. Braces 41 in like manner may be connected between the legs at the lower ends thereof to provide a rigid construction. A nut 42 is welded to the ends of the legs 36 and a threaded adjustable leg 43 is screwed within each of the nuts 42. The lower end of the adjustable leg 43 has a head 44 which is disposed in a recess in a foot plate 45, with the leg extending through a central aperture in the plate. A nut 46 on the leg is screwed down against the plate 45 and slightly back therefrom and welded to the leg 43. In this manner a wrench may be applied to the nuts 46, and by rotating the legs 43, the legs 36 are adjusted vertically to adjust the table 35 in height and for leveling the table. After such adjustment, nuts 47 on the legs 43 may then be jammed against the nuts 42 to lock the legs 43 securely in extension of the tubular legs 36 of the table. Pads 48 are disposed beneath the foot plates 45, being made of a resilient type of material to eliminate vibration.

Pillar blocks 51 and 52 are secured to the angle members 37 and 38 by screws 53. As illustrated in Fig. 7, each pillar block has a bearing 54 therein, which herein is illustrated as a sleeve bearing, but it is to be understood that ball or roller type of bearings may be utilized in lieu thereof. The pillar blocks support a shaft 50 which has an eccentric sleeve 55 secured thereto by screws 56. Ball bearings 57 are press-fitted on the ends of the sleeve 55 against shoulders 58 provided thereon. Eccentric washers 59 in a similar manner are secured on the sleeve abutting said bearings 57 and securely retaining them upon the eccentric sleeve 55, the washers being secured in position by similar screws 56. A platform 61 is supported on the side of the table 35, being rigidly secured thereto through connection to the angle member 38 and legs 36 by braces 62.

A motor 63 is mounted on the platform 61 by bolts 64, the motor operating through a gear reduction unit 65 to drive a shaft 66 which is joined to the end of the shaft 50 by the coupling 67. The motor and gear reduction unit provide low speed and high torque for driving the shaft 50 and rotating eccentric sleeve 55. A solenoid operated brake is provided on the motor for instantaneously stopping the motor when the circuit thereto is interrupted. A metal pad 68 and a resilient cushion 69, illustrated in Figs. 6 and 8, are secured to the under face of the transverse extension lever 21 by cap screws 71. As illustrated in Fig. 9, the opposite end of shaft 50 has a cam plate 72 secured thereon by nuts 73 which are secured on a thread at the opposite end of the shaft from that connected to the motor 63. A cam surface 74 on the cam plate 72, of a length of substantially 180° of arc, engages a roller 75 on an arm 76 of a single pole, double throw switch 77, closing the one contact and opening the other at the end of substantially 180° rotation of the shaft 50. The switch is secured to a flange of the angle member 37 of the table.

Within the scale house, as illustrated in one or more of the Figs. 1, 4 and 5, a fulcrum 81 supports the reading beam 33 on a standard 82 secured to a base 80. A standard 83 on the opposite end of the base 80 has a slot 84 in its upper end through which the end 85 of the beam 33 extends. A locking arm 86 is mounted on the standard 83 on a shaft 87 which is attached to the shaft of a switch 88 by a sleeve connector 89. The locking arm and the switch have a 90° angular movement so that when the locking arm locks the scale beam 33, the single pole, double throw switch will be moved from one pole position to the other. This is more clearly illustrated in the wiring diagram of Fig. 10 wherein the swtch 88, which is connected to a conductor 91, may complete a circuit to a contact 92 or 93. Similarly, the switch 77 connected to the conductor 94 may engage a contact 95 or 96. A conductor 97 connects the contacts 92 and 96 while a conductor 98 connects the contacts 93 and 95.

The standard 83 supports a light fixture 99 having a lamp 101 therein for illuminating a window 102 which may be enclosed by a glass having the word "weigh" thereon. This indicates to the operator that the stabilizer has been operated to release the transversely extending lever 21 so that weighing may occur. The lamp 101 is connected between the conduit 97 and the conduit 100 so as to be illuminated during the time the lever 21 is released. A motor starting relay 104 is connected to the circuit 100 to complete a circuit 105 to the motor 63 when its contacts are closed.

After a load is weighed, the operator swings the locking arm 86 clockwise to lock the reading beam 33 against movement, thereby operating the contacts of the switch 88 to complete a circuit to the contact 93. This energizes the relay 104 which completes a circuit to the motor 63, rotating the shaft 50 through approximately 180° to move the bearings 57 into engagement with the pad 68, thereby engaging the transverse extension lever 21 and locking it against movement at the highest point of the cam bearing 57. At this point the cam surface 74 of the cam plate 72 engages the roller 75 of the switch arm 76 to move the arm and operate the switch 77, breaking the circuit to the contacts 95 and completing a circuit to the contacts 96, thereby interrupting the operation of the motor. The opening of the circuit of the switch 88 to the contact 92 disconnects the lamp 101, thereby interrupting the illumination for the sign 102. When it is desired to perform a weighing operation, the locking arm is moved counterclockwise to release the scale beam 33, thereby operating the switch 88 from engagement with the contact 93 to complete a circuit to the contact 92. A circuit is again completed through the conductor 97 and contact 96 to the relay 104 which completes a circuit to the motor 63 and rotates the shaft 50 until the cam surface 74 moves from engagement with the switch arm 76 to thereby interrupt the circuit through the contact 96 and complete a circuit through the contacts 95. The shaft 50 will then have been driven approximately 180°, completely lowering the bearing 57 out of engagement with the pad 68, freeing the transverse extension lever 21 so that it may operate the reading beam 33. The circuit to the lamp 101 is completed and the lamp remains illuminated until the contact 92 is disengaged. At the end of the weighing operation, the operator again moves the locking arm 86 clockwise to lock the reading beam 33, thereby breaking the circuit to the contact 92 and completing a circuit to the contact 93.

The scale functions in the same way as it did before the lockout device was installed thereon. Before a weighing operation was undertaken, the operator rocked the rocking arm to release the reading beam, which locking arm was reversely rocked to lock the reading beam after the weighing operation. When the operator performs these functions, the motor is automatically actuated to release the lockout mechanism so that a weighing operation can be performed, or after a weighing operation to actuate the lockout mechanism to engage the transverse lever and positively lock out the scale. The link which connects the transverse lever to the reading beam usually has clearance therein so that the transverse lever may be raised without affecting the beam. When the lever is lowered, however, the link will always be engaged to properly actuate the reading beam to give indications of weight. A slot and pin or similar arrangement may be used to permit the raising of the lever without harming the reading beam support.

What is claimed is:

1. The combination with a scale having a plurality of deflectable beams for supporting an article to be weighed, a transversely extending lever beam joined to said deflectable beams for moving a reading beam which indicates the weight of the article being weighed, of a lockout device, means moving said lockout device into and out of engagement with the transversely extending lever beam to prevent and permit a weighing operation, a motor for driving said lockout mechanism, a cam on said mechanism, a cutoff switch actuated by said cam, and an operating switch in a circuit with said first switch which when actuated to one position causes the motor to drive said lockout mechanism to one position and rotate the cam substantially 180° to cut off the first said switch and stop the motor and when said operating switch is moved to another position to start said motor for moving said lockout mechanism to its other postion until the circuit is cut off again by said first switch actuated by a substantially 180° travel of the cam on said mechanism.

2. A mechanism for locking out the main load supporting beams of a scale including, in combination movable means on said mechanism for engaging said beams and preventing their movement, a motor on said mechanism for driving said movable means to engaged and disengaged positions, a switch on said mechanism, and a cam on said mechanism for operating said switch, said switch and cam being relatively operated to cut off the motor when said means has been moved to engaged position.

3. A mechanism for locking out the deflectable load supporting beams of a heavy scale including, in combination, a table, adjustable means for regulating the height of the table, rotatable cam means on the table for engaging and disengaging said deflectable beams being adjusted relative thereto by said table, a motor for rotating said cam means, and means for interrupting the operation of the motor each half revolution of the cam means when in engaged and disengaged relation with said element.

4. A mechanism for locking out the deflectable load supporting beams of a heavy scale including, in combination, a table, adjustable means for regulating the height of the table, rotatable cam means on the table for engaging and disengaging said deflectable beams being adjusted relative thereto by said table, a motor for rotating said cam means, means for interrupting the operation of the motor each half revolution of the cam means when in engaged and disengaged relation with said element, a reading beam actuated by the deflectable beams for providing readings for the object being weighed, lockout means for said reading beam, and means actuated by the lockout means for controlling the operation of the motor before and after a weighing operation.

5. A mechanism for locking out the deflectable load supporting beams of a heavy scale including, in combination, a table, adjustable means for regulating the height of the table, rotatable cam means on the table for engaging and disengaging said deflectable beams being adjusted relative thereto by said table, a motor for rotating said cam means, means for interrupting the operation of the motor each half revolution of the cam means when in engaged and disengaged relation with said element, a reading beam actuated by the deflectable beams for providing readings for the object being weighed, lockout means for said reading beam, means actuated by the lockout means for controlling the operation of the motor before and after a weighing operation, and means indicating to the operator that the deflectable beams are disengaged by said lockout means.

6. A lockout means for the deflectable beams of a heavy scale having an extending element carried thereby including, in combination, a support, a rotatable shaft on said support, an eccentric sleeve mounted on said shaft, bearing means supported by said eccentric sleeve and raised thereby when the shaft is rotated to engage said element of the deflectable beams and to retain the element and beams against movement, a motor for driving said shaft, a cam having a cam surface of substantially 180° secured to said shaft, and a switch actuated from one to another position by said cam for interrupting the motor each time the shaft is rotated substantially 180°.

7. A lockout means for the deflectable beams of a heavy scale having an extending element carried thereby including, in combination, a support, a rotatable shaft on said support, an eccentric sleeve mounted on said shaft, bearing means supported by said eccentric sleeve and raised thereby when the shaft is rotated to engage said element of the deflectable beams and to retain the element and beams against movement, a motor for driving said shaft, a cam having a cam surface of substantially 180° secured to said shaft, a switch actuated from one to another position by said cam for interrupting the motor each time the shaft is rotated substantially 180°, a reading beam connected to said deflectable beams, a lockout arm for said reading beam, a switch connected to said lockout arm for engaging one or the other of its contacts when moved to locking and unlocking position, and a circuit between said switches whereby when the arm is moved to release the reading beam the motor will be operated to drive the shaft to rotate the eccentric sleeve and lower said bearing means and when moved to lock the reading beam will cause said motor to drive the shaft rotating the eccentric sleeve and raising the bearing means for locking said deflectable beams against movement.

References Cited in the file of this patent

UNITED STATES PATENTS

| | | |
|---|---|---|
| 759,044 | Taylor | May 3, 1904 |
| 948,289 | Cromley | Feb. 1, 1910 |
| 1,323,387 | Bagg | Dec. 2, 1919 |
| 1,653,043 | Hamblin | Dec. 20, 1927 |
| 2,002,411 | Moxley | May 21, 1935 |
| 2,014,277 | Bousfield | Sept. 10, 1935 |
| 2,185,045 | Unruh et al. | Dec. 26, 1939 |
| 2,283,634 | Jacobus | May 19, 1942 |
| 2,307,695 | Mansbendel | Jan. 5, 1943 |